Jan. 29, 1924.  
D. R. SPUNG  
1,482,159  
EMERGENCY BRAKE FOR VEHICLES  
Filed March 6, 1923  
2 Sheets-Sheet 1
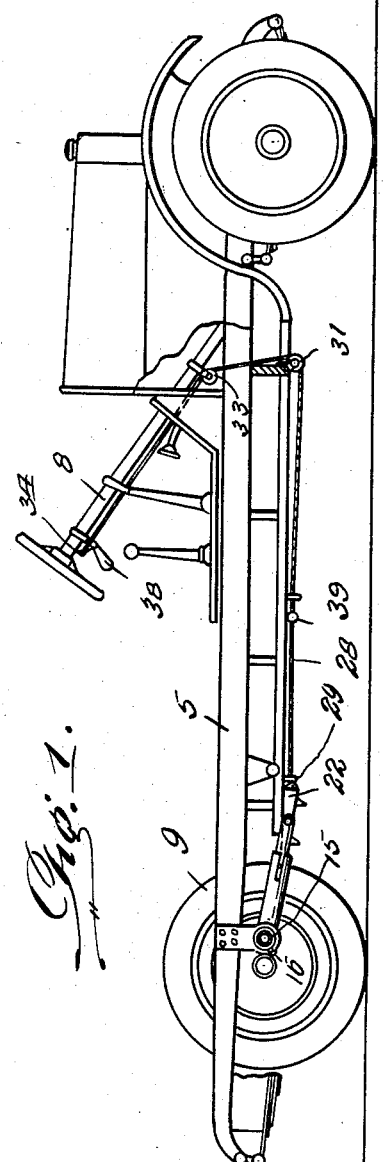
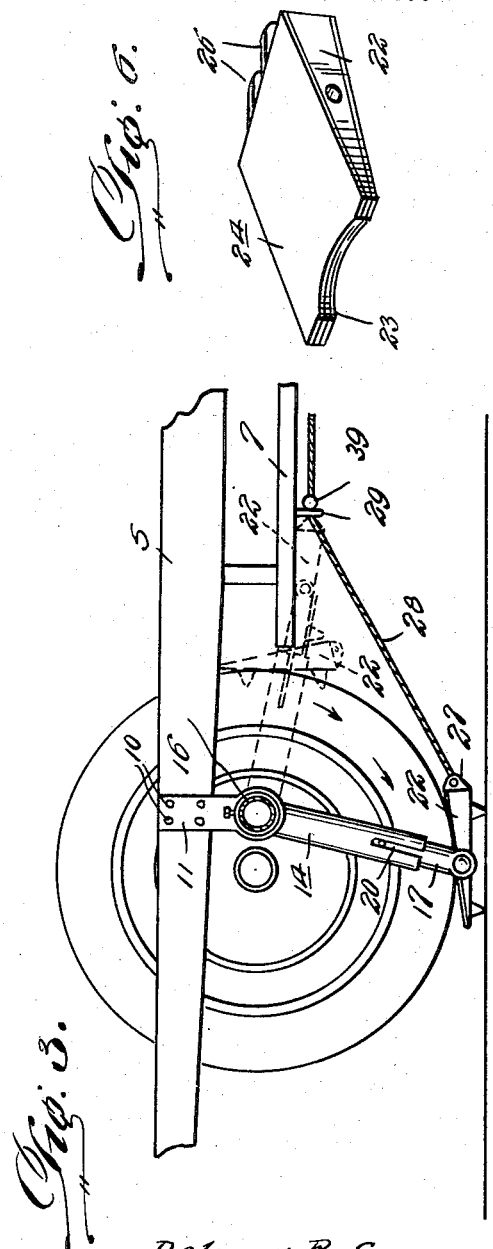
Delmar R. Spung,
Inventor
Attorney

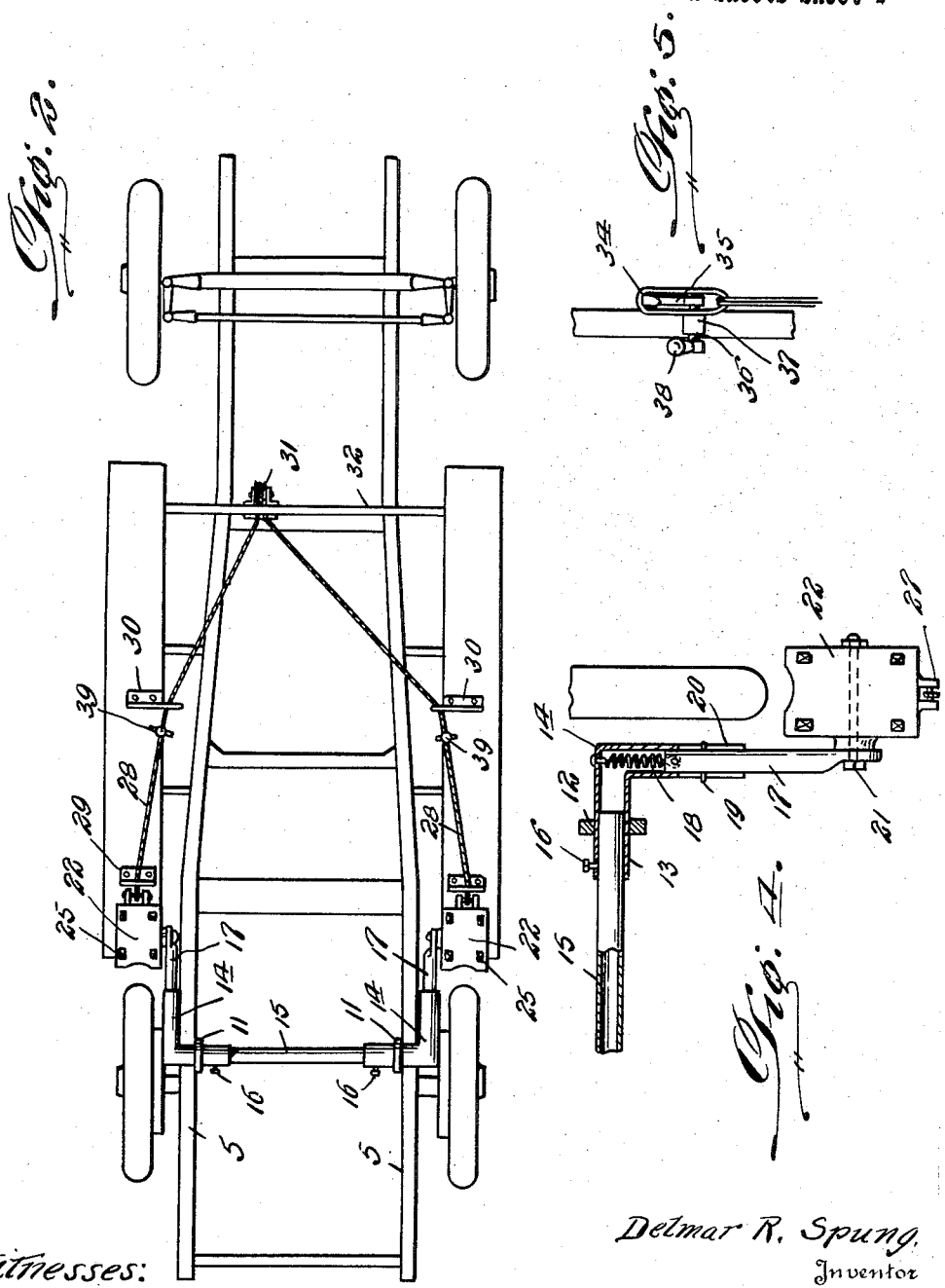

Patented Jan. 29, 1924.

1,482,159

UNITED STATES PATENT OFFICE.

DELMAR R. SPUNG, OF CROOKSVILLE, OHIO.

EMERGENCY BRAKE FOR VEHICLES.

Application filed March 6, 1923. Serial No. 623,094.

*To all whom it may concern:*

Be it known that DELMAR R. SPUNG, a citizen of the United States, residing at Crooksville, in the county of Perry and State of Ohio, has invented certain new and useful Improvements in Emergency Brakes for Vehicles, of which the following is a specification.

This invention relates to emergency brakes primarily adapted for application upon motor vehicles of practically all types with which I am now familiar, the primary object thereof residing in the provision of such a brake including a pair of plate members adapted to be thrown to a position whereby the rear wheels may be run thereon for consequently effecting the braking of the vehicle and overcoming any liability of the skidding of the same.

A further object of my invention is the provision of such an emergency brake for vehicles that is comparatively simple of construction and of such a nature as to be readily applied to all types of motor vehicles.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a side elevational view of the conventional form of motor vehicle, the body thereof being removed, and provided with my emergency brake;

Figure 2 is a bottom plan view of this vehicle equipped with my improved emergency brake;

Figure 3 is an enlarged detail cross section of the rear end of the vehicle, one of the braking elements of my emergency brake being shown in a position beneath the vehicle, the same being also shown in dotted line position;

Figure 4 is a plan view partly in cross section of one of the braking elements together with its supporting member;

Figure 5 is a fragmentary elevation of the motor vehicle steering column disclosing more clearly the controlling means of my emergency brake; and Figure 6 is a perspective of one of the braking shoes per se.

Referring to the drawings in detail and particularly Figures 1 to 4, inclusive, 5 designates the chassis bar of a motor vehicle; 7 the running boards; 8 the usual steering column; and 9 the driving wheel. These elements are all found in motor vehicles and therefore not of the essence of my invention, the same being shown so as to more clearly set forth the relation of my emergency brake therewith.

Bolted, riveted or otherwise secured as at 10 to the said chassis bar 5 of the vehicle, inwardly thereof and slightly forward of the rear axle of the vehicle are pendant brackets 11, the lower ends of the same being enlarged and provided with openings 12. Engaging through the openings in these brackets are the horizontal arms 13 of L-shaped tubes 14. Engaging within these horizontal arms of said tubes is a cross tube 15, the same being adjustably secured at its ends within said tube through the instrumentality of said screws 16.

Freely slidable within the other arms of the tubes 14 are solid rods 17, the upper ends of these rods being connected to the adjacent ends of the coil springs 18, the opposite ends of this coil spring being in turn secured within the said tube, it being noted that the arms 17 are provided adjacent their upper ends with cross pins 19 slidable in relatively elongated slots 20 in said arms in the L-tubes 14. The springs 18 normally extend the rods 17 upwardly into the tubes, said cross pins 19 limiting this upward sliding movement and at the same time preventing any rotation of the rods within the said arms of the tubes.

Pivotally secured at 21 to the lower ends of said rods 17 are brake shoes 22, the transverse axis of the same being at right-angles to the rods 17 and in such a position thereon as to engage beneath said driving slides 9 in a manner hereinafter more fully described.

As more clearly shown in Figure 6, these brake shoes 22 are of gradually decreased thickness toward the front ends of the same, the ends of the same being provided with arcuate-shaped cut-outs 23. Upon the top face of each of the brake shoes 22 are rubber mats 24 and formed or secured upon the under side thereof are pendant prongs 25, these prongs being transversely spaced from each other a distance greater than the width of the tires upon the wheels 9. The brake shoes 22 are each formed upon their thickened ends with forwardly projecting ears 26 and secured thereto as at 27 are the ends of cables 28. These cables 28 extend forwardly and are engaged through openings in pendant brackets 29 upon the running boards 7, they being in turn engaged through openings in other brackets 30 also upon the running boards and at points distant from the first mentioned brackets 29. The said cables are then extended forwardly or inwardly and are engaged over a pulley 31 upon the usual cross connecting bar 32 of the said running boards. These cables then extend upwardly and are again engaged over a pulley 33 secured adjacent the lower end of the said steering column 8, the ends of these cables carrying a relatively elongated chain link 34. This link 34 is engaged over the hook end of an arm 35, this arm being keyed to a usual stub shaft 36 which is rotatable in a bearing 37 upon said steering column, the opposite end of this stub shaft carrying an operating handle 38.

Between said brackets 29 and 30 upon the running board 7 the cables are provided with abutments 39, the same adapted to bring up against the brackets 29 in a manner clearly shown in Figure 3 for limiting the rearward swinging movement of the brake shoes 22.

In view of the above description it will at once be apparent that the normal riding positions of the brake shoes are as shown in Figure 1, this position being maintained through the connection between the ends of the cables carrying the link 34 and the said arm 35 upon the steering column. Whenever it is desired to release the said brake shoes the handle 38 is swung outwardly at which time the shoes 22 will be brought into close contact with the wheels 9, the same being forced downwardly through their own weight and through the contact the wheel tires with the rubber pads 24 upon said brake shoes a further downward movement of these shoes causing the same to position directly forwardly of the wheels at which time the wheels will run upon the shoes in a manner clearly shown by the full lines in Figure 3, this action effectively causing a braking of the machine. Should at any time the vehicle drift backwardly the brakes may be released which will cause a wedging of the shoes between the wheels and the ends of the running boards as shown in dotted lines in Figure 3.

It is believed by me that it will be readily appreciated by those skilled in the art that I have provided a highly improved form of emergency brake and one that is absolutely effective in its operation and although I have herein shown and described the preferred embodiment of the present invention, it is nevertheless to be understood that minor changes may be made therein, without departing from the spirit and scope of the invention as claimed.

Having thus described my invention, what I claim as new and desire to secure by Letters Patent is:

In a vehicle emergency brake, a pair of tubular supporting members supported for rocking movement upon the vehicle chassis bars and forwardly of the vehicle rear axle, rods carried by said supporting members, brake shoes pivotally disposed upon the free ends of said rods, means for maintaining said shoes forwardly of the vehicle rear wheels, means for releasing said first mentioned means for permitting said shoes to swing downwardly beneath said wheel, and means for normally maintaining said shoes in close contact with said wheels.

In testimony whereof I affix my signature.

DELMAR R. SPUNG.